US012752702B2

(12) United States Patent
Shi et al.

(10) Patent No.: US 12,752,702 B2
(45) Date of Patent: Oct. 6, 2026

(54) VEHICLE SEARCH INDICATION METHOD, DEVICE, COMPUTER-READABLE STORAGE MEDIUM, AND VEHICLE

(71) Applicant: PATEO CONNECT+ Technology (Shanghai) Corporation, Shanghai (CN)

(72) Inventors: Hongren Shi, Shanghai (CN); Chuxiong Zhang, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 215 days.

(21) Appl. No.: 18/594,931

(22) Filed: Mar. 4, 2024

(65) Prior Publication Data

US 2024/0208406 A1 Jun. 27, 2024

Related U.S. Application Data

(63) Continuation of application No. PCT/CN2021/135087, filed on Dec. 2, 2021.

(30) Foreign Application Priority Data

Sep. 3, 2021 (CN) ......................... 202111035578.7

(51) Int. Cl.

| | |
|---|---|
| ***B60Q 5/00*** | (2006.01) |
| ***G01S 5/02*** | (2010.01) |
| ***H04W 4/024*** | (2018.01) |
| ***H04W 4/80*** | (2018.01) |

(52) U.S. Cl.

CPC ............ *B60Q 5/001* (2013.01); *G01S 5/0284* (2013.01); *G01S 5/0294* (2013.01); *H04W 4/024* (2018.02); *H04W 4/80* (2018.02)

(58) Field of Classification Search

None

See application file for complete search history.

(56) References Cited

U.S. PATENT DOCUMENTS

| | | | | |
|---|---|---|---|---|
| 2003/0020638 | A1 | 1/2003 | Sari et al. | |
| 2010/0309058 | A1* | 12/2010 | Kalliola | H04W 4/029 342/452 |
| 2018/0099643 | A1* | 4/2018 | Golsch | G01S 13/765 |

(Continued)

FOREIGN PATENT DOCUMENTS

| | | |
|---|---|---|
| CN | 101788661 A | 7/2010 |
| CN | 104427467 A | 3/2015 |

(Continued)

OTHER PUBLICATIONS

The World Intellectual Property Organization (WIPO) International Search Report for PCT/CN2021/135087 Jun. 6, 2022 6 Pages (including translation).

*Primary Examiner* — Ramon A. Mercado
*Assistant Examiner* — David Ruben Pedersen
(74) *Attorney, Agent, or Firm* — Anova Law Group, PLLC

(57) ABSTRACT

A vehicle search notification method includes detecting a user identification signal outside a vehicle, in response to receiving the user identification signal, determining a relative position of the vehicle with respect to a user based on the user identification signal, and playing a voice notification about vehicle search navigation through an external loudspeaker of the vehicle according to the relative position.

20 Claims, 10 Drawing Sheets

(56) References Cited

U.S. PATENT DOCUMENTS

| | | | | |
|---|---|---|---|---|
| 2022/0022013 | A1* | 1/2022 | Balasubramanian .. | G08G 1/005 |
| 2022/0329968 | A1* | 10/2022 | Raj ....................... | H04W 72/54 |

FOREIGN PATENT DOCUMENTS

| | | | |
|---|---|---|---|
| CN | 207587193 | U | 7/2018 |
| CN | 108648494 | A | 10/2018 |
| CN | 109769236 | A | 5/2019 |
| CN | 109841081 | A | 6/2019 |
| CN | 111770448 | A | 10/2020 |
| CN | 113093104 | A | 7/2021 |
| CN | 113306487 | A | 8/2021 |
| CN | 214067973 | U | 8/2021 |
| WO | 2021031385 | A1 | 2/2021 |

* cited by examiner

VEHICLE SEARCH INDICATION METHOD, DEVICE, COMPUTER-READABLE STORAGE MEDIUM, AND VEHICLE

CROSS-REFERENCE TO RELATED APPLICATION

The present disclosure is a continuation of International Application No. PCT/CN2021/135087, filed Dec. 2, 2021, which claims priority to Chinese Patent Application No. 202111035578.7, filed on Sep. 3, 2021, the entire contents of both of which are incorporated herein by reference.

TECHNICAL FIELD

The present disclosure relates to the vehicle search notification technology and, more particularly, to a vehicle search notification method, a vehicle search notification device, a computer-readable storage medium, and a vehicle.

BACKGROUND

More and more large parking lots are built to accommodate an increasing number of vehicles. These large parking lots are typically built in places with high traffic, such as commercial centers, large office buildings, transit centers, and high-density residential areas, to address the problem of limited parking spaces in these areas. However, in these large and complex parking lots, users often find it difficult to remember and locate the parking locations of their vehicles, which causes inconvenience when parking and finding their vehicles. Therefore, a vehicle search notification technology is needed to help users quickly and conveniently find the parking locations of their vehicles.

SUMMARY

Embodiments of the present disclosure provide a vehicle search notification method. The method includes detecting a user identification signal outside a vehicle, in response to receiving the user identification signal, determining a relative position of the vehicle with respect to a user based on the user identification signal, and playing a voice notification about vehicle search navigation through an external loudspeaker of the vehicle according to the relative position.

Embodiments of the present disclosure provide a vehicle search notification device, including one or more memories and one or more processors. The one or more processors are communicatively connected to the one or more memories and an external loudspeaker and configured to detect a user identification signal outside a vehicle, in response to receiving the user identification signal, determine a relative position of the vehicle with respect to a user based on the user identification signal, and play a voice notification about vehicle search navigation through the external loudspeaker of the vehicle according to the relative position.

Embodiments of the present disclosure provide a vehicle, including an external speaker, a monitor module, one or more memories, and one or more processors. The external speaker is arranged on an inner side of a vehicle body panel. The one or more processors are communicatively connected to the one or more memories the external speaker, and the monitor module and configured to detect a user identification signal outside a vehicle by the monitor module, in response to receiving the user identification signal, determine a relative position of the vehicle with respect to a user based on the user identification signal, and play a voice notification about vehicle search navigation through an external loudspeaker of the vehicle according to the relative position.

DETAILED DESCRIPTION OF EMBODIMENTS

Figure 1:
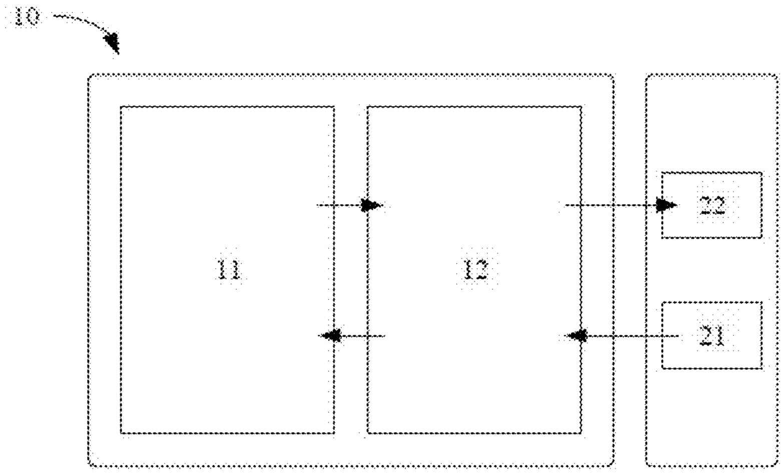
FIG. 1 is a schematic diagram of a vehicle search notification device according to some embodiments of the present disclosure.

To better understand the present disclosure, various aspects of the present disclosure are described in detail with reference to the accompanying drawings. These detailed descriptions are merely exemplary embodiments of the present disclosure and should not limit the scope of the present disclosure. Embodiments of the present disclosure can cove the scope of the claims and other selections or modifications based on the claims. The following description includes many details. The present disclosure may not use these details. In addition, some specific details will be omitted from the description in order to avoid confusing or obscuring the focus of the present disclosure.

In the description of the present disclosure, unless otherwise specified and limited, terms such as "installation," "connection," and "coupling" should be broadly understood. For example, the terms can refer to fixed connections, detachable connections, or integral connections. The terms can also refer to mechanical connections or electrical connections. The terms can also refer to direct connections or indirect connections through intermediate media. The terms can also refer to internal communication of two elements. For those of ordinary skill in the art, specific meanings of the terms can be understood in the present disclosure.

In addition, in the following description, terms like "up," "down," "left," "right," "front," "rear," "top," "bottom," "horizontal," and "vertical" should be understood as referring to the orientation depicted in the related drawings. These relative terms are only used for explanatory convenience and do not imply that the devices described must be manufactured or operated in specific orientations, and should not be understood as limiting the present disclosure.

Although terms like "first," "second," "third," etc., can be used to describe various assemblies, areas, layers, and/or sections, these assemblies, areas, layers, and/or sections should not be limited by these terms. These terms are only used to differentiate these assemblies, areas, layers, and/or sections. Therefore, the first assembly, area, layer, and/or section in the following discussion can be referred to as the second assembly, area, layer, and/or section without departing from embodiments of the present disclosure.

As mentioned above, in large and complex parking lots, users often find it difficult to remember and locate the parking locations of their vehicles, which causes inconvenience when parking and finding their vehicles. The existing vehicle location assistance technologies generally use vehicle keys to control the flashing of vehicle lights and/or vehicle horns to help users find their vehicles. However, in complex parking scenes such as a large parking lot and a multi-story parking lot, when the sight is blocked, it is difficult for users to find accurate paths to the vehicles solely based on flashing lights and horn signals.

Certain vehicle search solutions provide a vehicle search guidance path that is determined according to the satellite positioning signals of the vehicle and the cell phone. The guidance path is sent to the cell phone of the user through the mobile network to help the user find the vehicle. However, in an indoor scene such as the multi-story parking lot and the underground parking lot, the strengths of the satellite positioning signal and the mobile network are weak. Thus, the solution of providing the vehicle search guidance path through the cell phone can have low navigation accuracy and poor real-time performance, which seriously affects user experience. On the other hand, with this solution, the real orientation of the user cannot be accurately determined. The guidance notifications such as east, south, west, and north can be provided to the user according to the absolute coordinate of the parking lot, which is not beneficial for the user to quickly determine the following path according to the current orientation of the user.

To address the above defects of the existing technology, a vehicle search notification technology needs to be developed to broadcast the audio notification for vehicle search navigation through the external loudspeaker of the vehicle. Thus, the user can quickly find the accurate path to the vehicle location according to the sound source and notification content of the navigation audio.

In some embodiments, the present disclosure provides the vehicle search notification method, which can be implemented by a vehicle search notification device of the present disclosure. The vehicle search notification device can be configured at a vehicle of the present disclosure in a form of hardware equipment and/or software program. The vehicle can include any types of vehicles including gasoline vehicles, electrical vehicles, etc.

FIG. 1 is a schematic diagram of a vehicle search notification device according to some embodiments of the present disclosure. In embodiments shown in FIG. 1, the vehicle search notification device 10 includes a memory 11 and at least one processor 12. The memory 11 can include, but is not limited to a computer-readable storage medium of the present disclosure, which stores a computer instruction. The at least one processor 12 is communicatively connected to the memory 11 and is configured to perform the computer instruction stored in the memory 11 to implement the vehicle search notification method.

Furthermore, for the configuration forms of the hardware equipment, the vehicle search notification device 10 includes an independent memory 11 and at least one independent processor 12. The at least one processor 12 can be communicatively connected to the memory 11 and communicatively connected to a monitor module 21 of the vehicle and an external speaker 22. A user identification signal outside the vehicle can be detected by the monitor module 21. A voice notification about the vehicle search navigation can be played by the external speaker 22.

For the configuration form of the software program, the vehicle search notification device 10 can be stored in the form of the computer instruction in vehicle memory. The vehicle memory can be communicatively connected to the at least one vehicle processor. The at least one vehicle processor can also be communicatively connected to the monitor module 21 of the vehicle and the external speaker 22. Thus, the vehicle search notification device 10 in the form of a software program can adopt the vehicle memory as the memory 11 of the vehicle search notification device 10 and the at least one vehicle processor as the processor 12 of the vehicle search notification device 10. The user identification signal outside the vehicle can be detected by the monitor module 21 of the vehicle, and the voice notification about the vehicle search navigation can be played by the external loudspeaker 22 of the vehicle.

The principle of the vehicle search notification device can be described according to embodiments of the vehicle search notification method. Those skilled in the art can understand that embodiments of the vehicle search notification method are only some embodiments of the present disclosure and are intended to illustrate the main idea of the present disclosure and provide some specific solutions and are not used to limit all functions or all operation manners of the vehicle search notification device. Similarly, the vehicle search notification device is only an example of the present disclosure and does not limit the execution bodies of processes of the vehicle search notification method.

Figure 2:
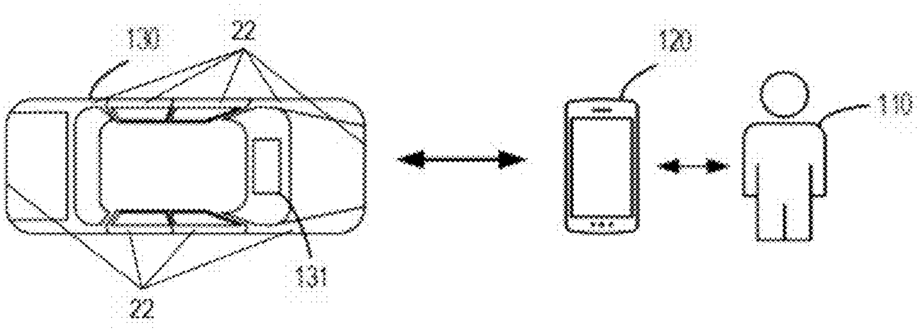
FIG. 2 is a schematic diagram showing a vehicle search notification scene according to some embodiments of the present disclosure.
Figure 3:
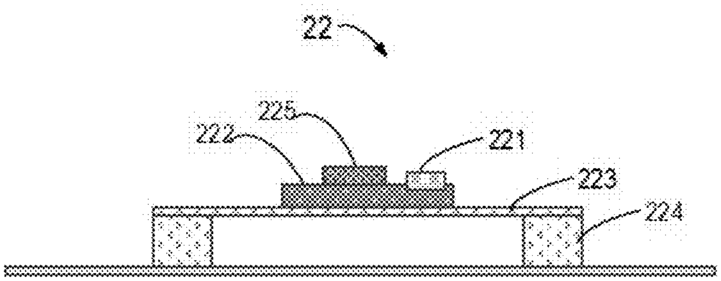
FIG. 3 is a schematic structural diagram of an external loudspeaker according to some embodiments of the present disclosure.
Figure 4:
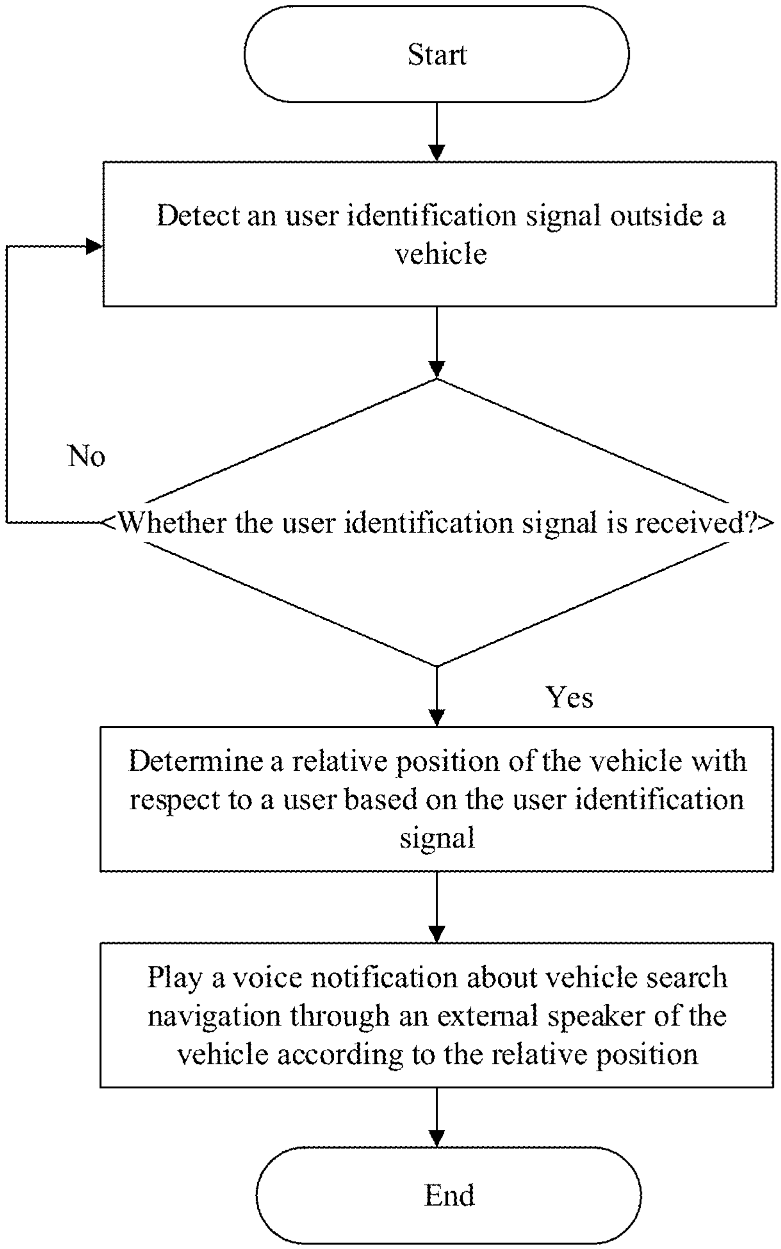
FIG. 4 is a schematic flowchart of a vehicle search notification method according to some embodiments of the present disclosure.

FIG. 2 is a schematic diagram showing a vehicle search notification scene according to some embodiments of the present disclosure. FIG. 3 is a schematic structural diagram of an external loudspeaker according to some embodiments of the present disclosure. FIG. 4 is a schematic flowchart of a vehicle search notification method according to some embodiments of the present disclosure.

As shown in FIG. 2, in some embodiments of the present disclosure, the vehicle search notification device 10 of embodiments of the present disclosure is a TBOX 131 embodied into a vehicle 130 in the form of a software module. The vehicle search notification device 10 uses the TBOX memory of the TBOX 131 as the memory and uses the at least one TBOX processor as the processor. The at least one TBOX processor can be directly or indirectly and communicatively connected to the TBOX memory. The at least one TBOX processor can read and perform the computer instruction stored in the TBOX memory to implement the corresponding control method.

Furthermore, the TBOX 131 of the vehicle 130 also includes a monitor module 21 based on Bluetooth® and/or UWB technology. Bluetooth® is a short-range wireless technology standard that is used for exchanging data between fixed and mobile devices over short distances and building personal area networks (PANs). The monitor module 21 is directly or indirectly and communicatively connected to the at least one TBOX processor. The monitor module 21 can be configured to, according to control instructions from the at least one TBOX processor, monitor Bluetooth® and/or UWB user identification signals emitted by a user terminal 120 such as a cell phone, a smartwatch, a smart wristband, smart glasses, a vehicle smart key, a tablet, etc. The user identification signals can include identification information indicating user identity, for example, Bluetooth® and/or UWB signals carrying equipment MAC addresses. The vehicle search notification device 10 can determine whether the user terminal 120 emitting the user identification signal is the user terminal of the vehicle user according to the identification information.

In addition, external speakers 22 can be arranged on inner sides of one or more of vehicle body panels, such as front, rear, left, right, etc. These one or more external speakers 22 can be directly or indirectly and communicatively connected to the at least one TBOX processor and play corresponding voice content outside the vehicle according to the control instructions of the at least one TBOX processor. The external speakers 22 can be arranged in a chamber between the vehicle body panel used as the external surface of the vehicle 130 and the interior panel used as the internal surface of the vehicle 130 and can be adhered to the body panels or interior panels.

In some embodiments, an external speaker 22 arranged on the inner side of the front body panel of the vehicle 130 can be arranged on the inner side of the front bumper of the vehicle 130. An external speaker 22 arranged on the inner side of the rear body panel of the vehicle 130 can be arranged on the inner side of the rear bumper of the vehicle 130. External speakers 22 arranged on the inner side of the right body panel of the vehicle 130 can be arranged on the inner side of the right front sub-fender, right front door, right rear door, and/or right rear sub-fender of the vehicle 130. External speakers 22 arranged on the inner side of the left body panel of the vehicle 130 can be arranged on the inner side of the left front sub-fender, left front door, left rear door, and/or left rear sub-fender of the vehicle 130.

As shown in FIG. 3, in some embodiments, the external speakers 22 are made of piezoelectric sound generation modules. In some embodiments, a piezoelectric sound generation module 22 includes electrode pieces 221, which are configured to receive an excitation voltage from a drive circuit. The excitation voltage can be a high-frequency square wave with alternating polarity. The electrode piece 221 can be a pair of positive and negative electrode pieces. The piezoelectric sound generation module 22 further includes a piezoelectric ceramic 222, which is configured to extend or retract transversely or longitudinally under the action of the excitation voltage received by the electrode pieces 221. As mentioned earlier, the excitation voltage can be a high-frequency square wave with alternating polarity. Thus, the piezoelectric ceramic 222 will have mechanical deformation, i.e., extension or retraction, under the action of the alternating polarity square wave. In addition, the piezoelectric ceramic 222 can be a piezoelectric ceramic that is polarized transversely or longitudinally. Thus, the piezoelectric ceramic can generate transverse or longitudinal mechanical deformation under the action of the excitation voltage. In some embodiments, under a positive voltage (i.e., an upper surface of the piezoelectric ceramic 222 being connected to a positive pole of the excitation voltage, and a lower surface of the piezoelectric ceramic 222 being connected to a negative pole of the excitation voltage), the piezoelectric ceramic 222 can extend transversely (i.e., extend along a radial direction of the surface of a vibration plate 223). Under a negative voltage (i.e., the upper surface of the piezoelectric ceramic 222 being connected to the negative pole of the excitation voltage, and the lower surface of the piezoelectric ceramic 222 being connected to the positive pole of the excitation voltage), the piezoelectric ceramic 222 can retracts transversely (i.e., retracts along the radial direction of the surface of the vibration plate 223). The longer the transverse length of the piezoelectric ceramic 222 is, the stronger the low-frequency response of the vibration of the piezoelectric ceramic 222 is.

Further, the piezoelectric sound generation module 22 also includes the vibration plate 223 that is adhered to and fits with the piezoelectric ceramic 222. The vibration plate 223 can vibrate with the extension or retraction of the piezoelectric ceramic 222. Thus, the piezoelectric sound generation module 22 can convert the input excitation voltage into vibrations to emit sound.

In some embodiments, the vibration plate 223 can be directly adhered to the vehicle body panel used as the outer surface of the vehicle 130 to drive the vehicle body panel to vibrate. The larger the area of the vehicle body panel driven by the piezoelectric sound generation module 22 is, the stronger the low-frequency response of the vibration is, and the weaker the high-frequency response of the vibration is.

In some other embodiments, the piezoelectric sound generation module 22 also includes a vibration piece 224 arranged between the vibration plate 223 and the vehicle body panel. The vibration piece 224 does not cause the vibration plate 223 to vibrate. The vibration piece 224 can be configured to adhere the vibration plate 223 to the body panel, transmit the vibration to avoid resonance, and provide a space for the deformation of the vibration plate 223 to prevent the vibration plate 223 from being in contact with the body panel during the deformation. The vibration piece 224 can include, for example, a 3M glue. With the vibration piece 224, the frequency response of the vibration generated by the vibration plate 223 can be adjusted. For example, when the low-frequency response of the vibration needs to be enhanced, the area of the vibration piece 224 can be increased. When the low-frequency response of the vibration needs to be reduced, the area of the vibration piece 224 can be decreased.

In some embodiments, the piezoelectric sound generation module 22 also includes a counterweight block 225 arranged on a side of the piezoelectric ceramic 222 opposite to the vibration plate 223. The counterweight block 225 can also be configured to adjust the frequency response of the vibration generated by the vibration plate 223. For example, when the low-frequency response of the vibration needs to be enhanced, the weight of the counterweight block 225 can be increased. On the contrary, when the low-frequency response of the vibration needs to be reduced, the weight of the counterweight block 225 can be decreased.

Since the piezoelectric ceramic 222 typically has a good high-frequency response, the desired low-frequency response can be conveniently obtained by adjusting the area of the vibration piece 224 and/or the weight of the counterweight block 225.

Those skilled in the art can understand that the piezoelectric sound generation module 22 shown in FIG. 3 is only illustrative and is not intended to limit the scope of the present disclosure. For example, in some embodiments, the electrode pieces 221 can be arranged at different positions of the piezoelectric ceramic 222, or the excitation voltage can be applied to the piezoelectric ceramic 222 in other forms. In some other embodiments, a plurality of counterweight blocks 225 can be arranged in the piezoelectric sound generation module 22. In some embodiments, the piezoelectric sound generation module 22 can include a plurality of piezoelectric ceramics 222 and a plurality of corresponding pairs of electrode pieces 221. For example, a piezoelectric ceramic 222 can be arranged on each side of the upper and lower sides of the vibration plate 223 (e.g., another piezoelectric ceramic 222 can be arranged at the lower side of the vibration plate 223 symmetrical to the piezoelectric ceramic 22 show in the figure). The two piezoelectric ceramics 222 can extend or retract along opposite directions with the functions of the electrode pieces 221 to further enhance a vibration effect.

As shown in FIG. 4, during a vehicle search notification process, the vehicle search notification device 10 remains active when the vehicle 130 is parked with the engine or electrical motor off, e.g., the vehicle search notification device 10 can remain in a low power consumption operation mode. Thus, the monitor module 21 is operated to detect the external user identification signal of the vehicle 130.

In some embodiments, the monitor module 21 can include a UWB monitor module based on the UWB technology. The monitor module 21 can be configured to detect a UWB signal sent by a user terminal 120, such as the cell phone, the smartwatch, the smart wristband, the vehicle smart key, the tablet, etc., of the user 110 within a first range according to the control instructions of the vehicle search notification device 10 and determine the relative position of the vehicle 130 with respect to the user 110 according to the UWB signal. In the first range, the user can be ensured to hear the voice content played by the vehicle 130 clearly. Thus, the first range can be a radiation range within 20 m of the vehicle, e.g., 5 m, 10 m, 15 m, or 20 m.

Compared to an existing GPS satellite positioning signal, the UWB signal can be a short-range communication signal of the relative position between a detection signal transmitter and a signal receiver. The UWB signal can have advantages, such as accurate positioning, stable signal, and not being affected by environmental factors such as blockage of the top cover in an indoor scene. Thus, with the UWB signal, the relative position between the vehicle 130 and the user can be accurately and stably positioned in the parking scenes, such as the multi-story parking lot, underground parking lot, etc.

Further, in response to the UWB monitor module detecting a plurality of UWB signals emitted by the cell phone 120 of the user at a plurality of continuous moments, the vehicle search notification device 10 can further predict whether the user 110 needs the vehicle search notification function according to the position information indicated by the plurality of UWB signals.

For example, if the UWB signal indicates that the distance from the user 110 to the vehicle 130 is less than a predetermined distance, e.g., 2 m, the vehicle search notification device 10 can determine that the vehicle 130 is within the sight range of the user 110 to determine that the user 110 does not need the vehicle search notification function. Then, the vehicle search notification device 10 can shield the user identification signal to stop playing the voice notification about the vehicle search navigation outside the vehicle 130.

For another example, if the plurality of UWB signals sent at a plurality of continuous moments indicate that the distance from the user 110 to the vehicle 130 is increased from less than to more than a predetermined distance, e.g., 2 m, the vehicle search notification device 10 can determine that the user 110 is leaving the vehicle 130 and does not need the vehicle search notification function. Thus, the vehicle search notification device 10 can shield the subsequent user identification signal to avoid playing the wrong voice notification to the user 110 leaving the vehicle 130. Then, if the vehicle search notification device 10 detects the UWB signal after disappearing for a certain period, the vehicle search notification device 10 can determine that the user 110 is returning to the vehicle 130 and needs the vehicle search notification function. Thus, the vehicle search notification device 10 can enable the user identification signal and play voice notifications about the vehicle search navigation by the external speakers 22 of the vehicle 130 to help the user 110 quickly find the accurate path to the vehicle 130. Thus, whether the user needs a vehicle search notification can be predicted according to the relative position between the user and the vehicle and the predetermined distance threshold. Therefore, when the user is within a certain range of the vehicle, the vehicle search notification can be automatically performed or stopped.

Those skilled in the art can understand that the solution of continuously running the UWB module 21 to monitor the UWB signals of user terminals 120 when the vehicle 130 is parked and the engine or electrical motor is off is merely a non-limiting embodiment of the present disclosure. The above solution is intended to clearly illustrate the main concept of the present disclosure and provide a specific solution that is convenient to be implemented, rather than limit the scope of the present disclosure.

In some other embodiments, the monitor module 21 can include a Bluetooth® module and a UWB module, or a composite monitor module integrated with Bluetooth® and UWB monitoring functions. The Bluetooth® module can detect the Bluetooth® signals emitted by user terminals 120 such as cell phones, smartwatches, smart wristbands, smart glasses, vehicle smart keys, tablets, etc., within a second range according to the control instructions of the vehicle search notification device 10. The UWB module can detect the UWB signals emitted by user terminals 120 such as cell phones, smartwatches, smart wristbands, vehicle smart keys, tablets, etc., within the first range according to control instructions of the vehicle search notification device 10. Since the propagation distance of the Bluetooth® signal is greater than the propagation distance of the UWB signal, the second range can be larger than the first range. For example, the second range can cover a radiation range within 100 m of the vehicle (e.g., 50 m, 80 m, or 100 m). In the first range, the user also needs to be ensured to hear the voice content played by the vehicle 130 clearly. Thus, the first range can still be the radiation range within 20 m to the vehicle 130 (e.g., 5 m, 10 m, 15 m, or 20 m).

Figure 5:
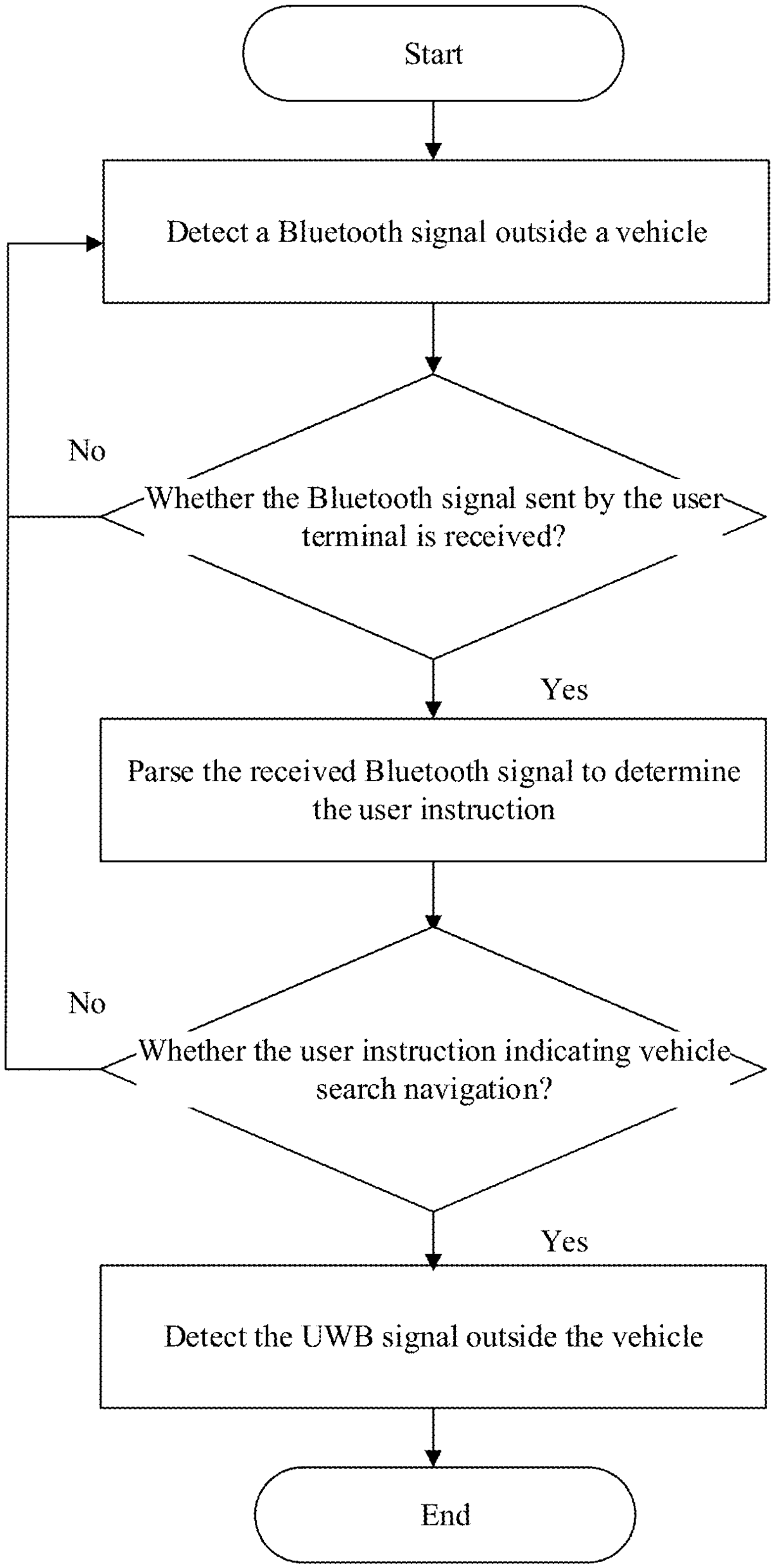
FIG. 5 is a schematic flowchart showing triggering of a vehicle search notification function according to some embodiments of the present disclosure.

FIG. 5 is a schematic flowchart showing triggering of a vehicle search notification function according to some embodiments of the present disclosure.

As shown in FIG. 5, the vehicle search notification device 10 remains active when the vehicle 130 is parked with the engine or electrical motor off. For example, the vehicle search notification device 10 can remain in the low energy consumption operation mode. The Bluetooth® module of the vehicle 130 can be operated to detect a Bluetooth® signal emitted by a user terminal 120 within a second range (e.g., 100 m) outside the vehicle 130. Thus, the UWB module can remain asleep to reduce the power consumption of the vehicle search notification device 10 and extend the maintaining time of the vehicle search notification function.

During the vehicle searching process, the user 110 can first click on a physical or virtual button for the vehicle search function on the user terminal 120, such as the cell phone, smartwatch, smart wristband, vehicle smart key, tablet, etc., to control the user terminal 120 to emit a Bluetooth® signal indicating the vehicle search notification function. Then, the Bluetooth® module of the vehicle 130 connected to the user terminal 20 within the second range can detect and parse the Bluetooth® signal to determine the corresponding user instruction and provide a corresponding remote service according to the user instruction.

In some embodiments, in response to parsing and determining that the received Bluetooth® signal indicates the user instruction of the vehicle search navigation, the vehicle search notification device 10 can determine that the user 110 needs the vehicle search notification function. Then, the vehicle 130 can be first controlled to flash the signal lights and/or honk the horn to initially help the user 110 search for the vehicle 130.

Further, if the user 110 cannot find the accurate path to the vehicle position based on the basic notifications of flashing signal lights and/or the horn, the user can send a request for further vehicle search notification to the vehicle search notification device 10 through the user terminal 120. In response to the request for further vehicle search notification, the vehicle search notification device 10 can first determine the user location according to the received Bluetooth® signal-indicated position information, then roughly determine the distance from the vehicle 130 to the user 110 according to the vehicle position and the determined user position, and determine whether the distance from the user 110 to the vehicle 130 exceeds the preset first range (e.g., 20 m).

If the distance from the user 110 to the vehicle 130 exceeds the preset first range, the vehicle search notification device 10 can first determine the approximate relative position of the vehicle 130 with respect to the user 110 according to the Bluetooth® signal-indicated user position and send a guidance path based on the approximate relative position to the user terminal 120 to guide the user 110 to approach the vehicle position. Then, when the user 110 enters the first range pre-determined under the guidance of the guidance path, the vehicle search notification device 10 can wake up the UWB module to detect the UWB signal emitted by the user terminal 120 within the first range outside the vehicle 130. The vehicle search notification device 10 can precisely determine the relative position of the vehicle 130 with respect to the user 110 according to the received UWB signal.

Those skilled in the art can understand that the solution of waking up the UWB module after the user 110 enters the preset first range is a non-limiting embodiment of the present disclosure and is intended to illustrate the main concept of the present disclosure, provide a power-saving solution, and does not limit the scope of the present disclosure.

In some other embodiments, the vehicle search notification device 10 can also directly wake up the UWB module in response to the request for further vehicle search notification to achieve the same effect of precisely determining the relative position of the vehicle 130 with respect to the user 110 according to the received UWB signal.

Compared to the UWB module, the Bluetooth® module can have a longer monitor distance and lower power consumption. Therefore, the user identification signal sent by the user terminal 120 outside the vehicle 130 can be detected by continuously running the Bluetooth® module, and the UWB module can be then waken up according to the actual vehicle search request of the user 110. On one hand, the basic vehicle search notification functions such as flashing light, honking horn, user terminal navigation, etc., can be implemented in a larger range. On another hand, the power consumption of the vehicle 130 with the engine or electrical motor off can be reduced to extend the lasting time of the vehicle search notification function.

Those skilled in the art can also understand that the solution, in which the user clicks on a physical or virtual button for the vehicle search function on the user terminal 120 to control the user terminal 120 to send the Bluetooth® signal indicating the vehicle search notification function, is merely a non-limiting embodiment of the present disclosure, is intended to clearly illustrate the main concept of the present disclosure, provide a specific solution that is convenient to implement, and does not limit the scope of the present disclosure.

In some other embodiments, the user can also enter the vehicle search instruction (e.g., where are you) to the user terminal 120 through the keyboard or voice to control the user terminal 120 to send the Bluetooth® signal indicating the vehicle search notification function to the vehicle 130 to activate the vehicle search notification function.

In some other embodiments, the user can control the user terminal 120 to send the Bluetooth® signal indicating the vehicle search notification function to the vehicle 130 by entering a preset shortcut gesture to the user interface the user terminal 120 to activate the vehicle search notification function.

In some other embodiments, the user can shake the user terminal 120 to control the user terminal 120 to send the Bluetooth® signal indicating the vehicle search notification function to the vehicle through a shake function to activate the vehicle search notification function.

Figure 6:
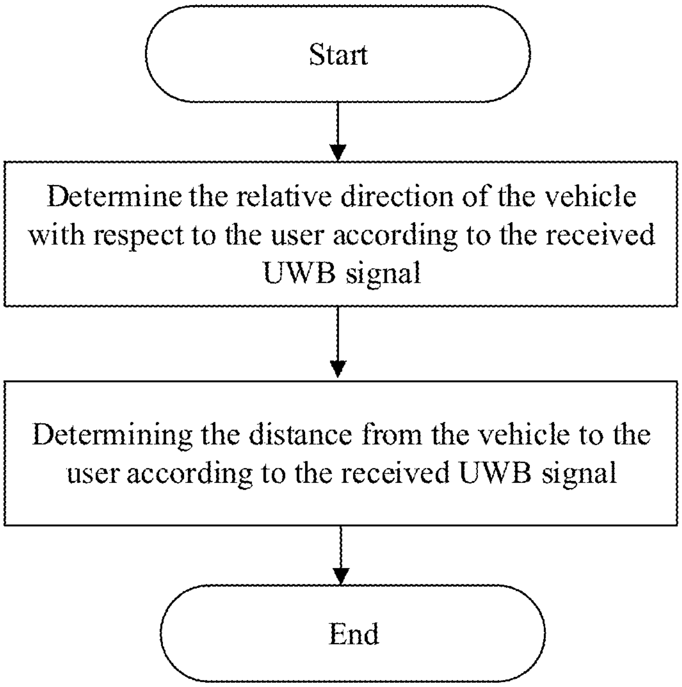
FIG. 6 is a schematic flowchart showing determining a relative position of a vehicle with respect to a user according to an Ultra Wide Band ("UWB") signal according to some embodiments of the present disclosure.

FIG. 6 is a schematic flowchart showing determining a relative position of a vehicle with respect to a user according to a UWB signal according to some embodiments of the present disclosure.

As shown in FIG. 6, in embodiments of the present disclosure, in response to starting the UWB module and detecting the UWB signal sent by the user terminal 120, the vehicle search notification device 10 can determine a relative direction $d_{direction}$ of the vehicle 130 with respect to the user 110 according to the UWB signal and determine the distance $d_{distance}$ from the vehicle 130 to the user 110 according to the UWB signal. Then, the vehicle search notification device 10 can determine the relative position D ($d_{direction}$, $d_{distance}$) of the vehicle 130 with respect to the user 110 according to the relative direction $d_{direction}$ and the distance $d_{distance}$.

Figure 7:
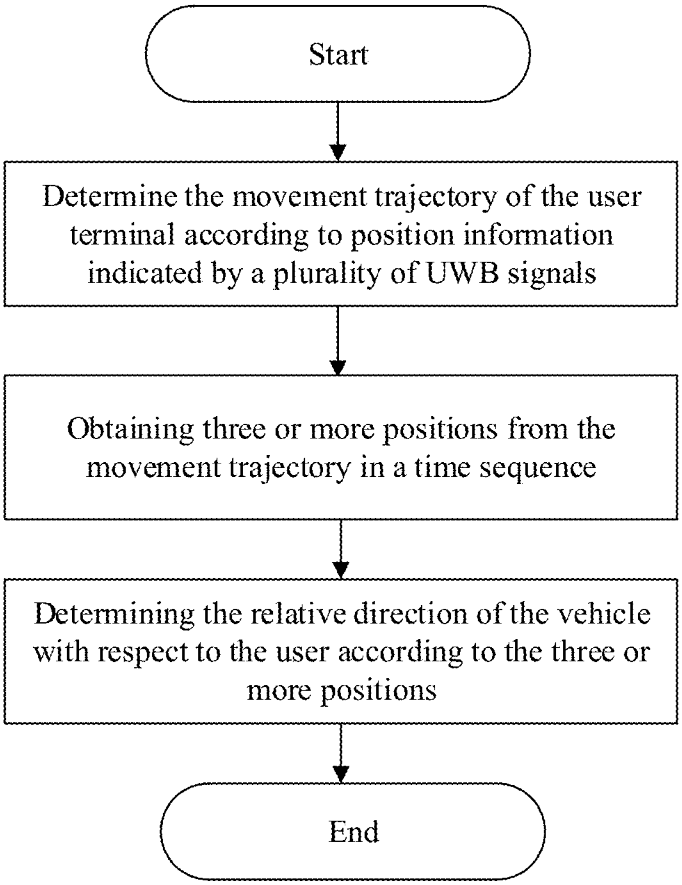
FIG. 7 is a schematic flowchart showing determining a relative direction of a vehicle with respect to a user according to some embodiments of the present disclosure.

FIG. 7 is a schematic flowchart showing determining the relative direction of the vehicle with respect to the user according to some embodiments of the present disclosure. FIGS. 8A to 8H are schematic diagrams showing determining the relative direction of the vehicle with respect to the user according to some embodiments of the present disclosure.

As shown in FIG. 7, in embodiments of the present disclosure, when the user 110 enters the first monitor range of the UWB module, the vehicle search notification device 10 first sends notification information to the user terminal 120 to notification the user to wave the user terminal 120 to generate at least one continuous movement trajectory. In some embodiments, the notification information can be used to instruct the user to wave the user terminal in front of the user to form a continuous arc movement trajectory. Meanwhile, the vehicle search notification device 10 can continue to detect the plurality of UWB signals sent by the user terminal 120 at the plurality of continuous moments by using the UWB module of the vehicle 130. The vehicle search notification device 10 can determine the movement trajectory of the user terminal 120 according to the position information indicated by the plurality of UWB signals.

Then, the vehicle search notification device 10 can parse the movement trajectory according to the position coordinates of the points on the movement trajectory and the acquisition time and intercept a last segment of the continuous curved trajectory of the user terminal 120 to determine the orientation of the user. In some embodiments, the vehicle search notification device 10 can determine whether the movement trajectory is continuous according to the change rate of the direction angle $\alpha$ (i.e., $\Delta\alpha$) between neighboring points. In some embodiments, assume that the direction angle from the first point to the second point is $\alpha_1$ and the direction angle from the second point to the third point is $\alpha_2$, the corresponding change rate of the direction angle can be $\Delta\alpha_{21}=\alpha_2-\alpha_1$. When determining continuity, if $\Delta\alpha_{21}$ is smaller than or equal to a preset change rate threshold $\Delta\alpha_{th}$, the vehicle search notification device 10 can determine that a first point, a second point, and a third point belong to a same continuous curved trajectory. On the contrary, if $\Delta\alpha_{21}$ is greater than the preset change rate threshold $\Delta\alpha_{th}$, the vehicle search notification device 10 can determine that the second point and the third point belong to the next continuous curved trajectory.

Those skilled in the art can understand that the above solution of parsing and intercepting the continuous curved trajectory according to the direction angle change rate $\Delta\alpha$ is only a non-limiting embodiment of the present disclosure and is intended to demonstrate the main concept of the present disclosure. The above solution is intended to provide a solution that is conveniently implemented by the public and is not used to limit the scope of the present disclosure.

In some other embodiments, the vehicle search notification device 10 can also use other technical means to achieve the same effect of intercepting the curved movement trajectory. For example, the vehicle search notification device 10 can also use computer vision technology to extract feature vectors from the movement trajectory of the user terminal 120, and use a pre-trained neural network model to automatically intercept the curved movement trajectory.

Those skilled in the art can understand that the solution of intercepting the last segment of the continuous curved trajectory is a non-limiting embodiments of the present disclosure and is intended to illustrate the main concept of the present disclosure, provides a specific solution for implementation, and does not limit the scope of the present disclosure.

In some other embodiments, the vehicle search notification device 10 can continuously detect the plurality of UWB signals sent by the user terminal 120 in a preset time after sending the notification information and determine the movement trajectory of the user terminal 120 according to the position information indicated by the plurality of UWB signals sent in the preset time.

As shown in FIG. 7, after obtaining the curved trajectory of the user terminal 120, the vehicle search notification device 10 obtains the position information of the three or more points obtained from the curved trajectory in a time sequence and determines the relative direction $d_{direction}$ of the vehicle 130 with respect to the user 110 according to the position information of the three points.

In some embodiments, the movement trajectory generated when the user 110 waves the user terminal 120 may not extend vertically. The vehicle search notification device 10 can project the obtained curved trajectory to the horizontal plane. Then, the vehicle search notification device 10 can obtain the position information of start point position A, way point position C, and end point position B of the curved trajectory from the curved trajectory in a time sequence. Then, the vehicle search notification device 10 can determine the relative direction $d_{direction}$ of the vehicle 130 with respect to the user 110 according to the distances from start position A, way point position C, and end point position B to the vehicle position O.

Figure 8A:
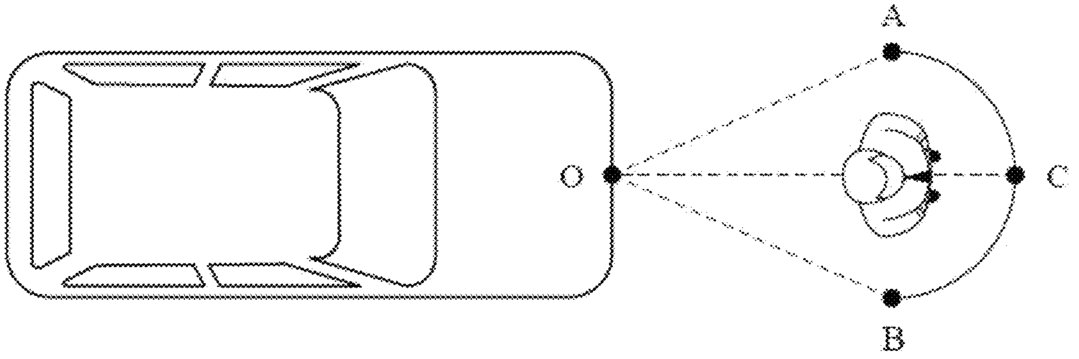
FIGS. 8A-8H are schematic diagrams showing determining a relative direction of a vehicle with respect to a user according to some embodiments of the present disclosure.

As shown in FIG. 8A, if distance OA from vehicle position O to start point position A is less than distance OC from vehicle position O to way point position C (i.e., OA<OC), and distance OB from vehicle position O to end point position B is less than distance OC from vehicle position O to way point position C (i.e., OB<OC), the vehicle search notification device 10 can determine that the vehicle 130 is behind the user 110.

Figure 8B:
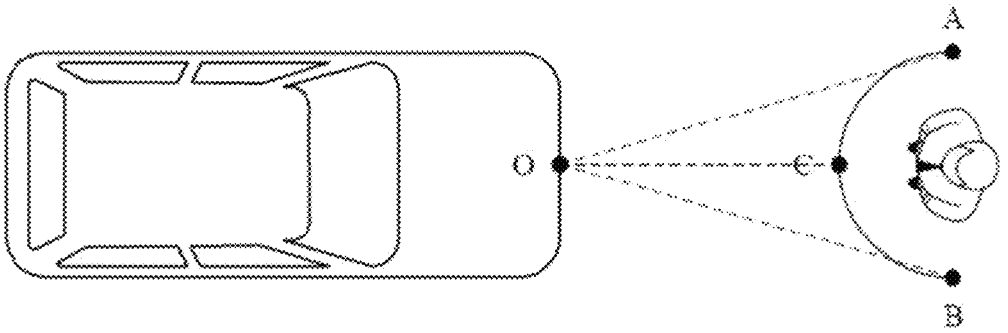

As shown in FIG. 8B, if distance OA from vehicle position O to start point position A is greater than distance OC from vehicle position O to way point position C (i.e., OA>OC), and distance OB from vehicle position O to end point position B is greater than distance OC from vehicle position O to way point position C (i.e., OB>OC), the vehicle search notification device 10 determines that the vehicle 130 is in front of the user 110.

Figure 8C:
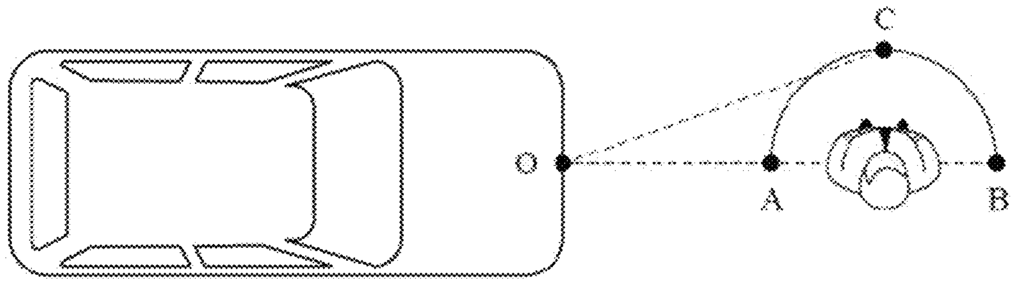

As shown in FIG. 8C, if distance OA from vehicle position O to start point position A is greater than distance OC from vehicle position O to way point position C (i.e., OA>OC), and distance OC from vehicle position O to way point position C is greater than distance OB from vehicle position O to end point position B (i.e., OC>OB), the vehicle search notification device 10 determines that the vehicle 130 is to the left of the user 110.

Figure 8D:
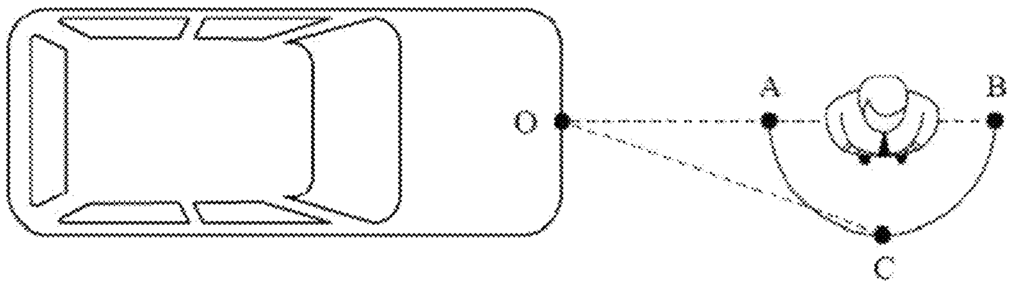

As shown in FIG. 8D, if distance OA from vehicle position O to start point position A is less than distance OC from vehicle position O to way point position C (i.e., OA<OC), and distance OC from vehicle position O to way point position C is less than distance OB from vehicle position O to end point position B (i.e., OC<OB), the vehicle search notification device 10 determines that the vehicle 130 is to the right of the user 110.

In some embodiments, way point position C can be the middle point of the curved trajectory. When determining the relative direction $d_{direction}$ of the vehicle 130 with respect to the user 110, the vehicle search notification device 10 can further parse the curved trajectory to determine farthest point P and closest point Q to vehicle position O based on their positions on the curved trajectory and then determine the relative direction $d_{direction}$ of the vehicle 130 with respect to the user 110 based on the positions of farthest point P and closest point Q on the curved trajectory.

In some embodiments, as shown in FIG. 8A, if distance OA from vehicle position O to start point A is less than distance OC from vehicle position O to way point position C (i.e., OA<OC), and distance OB from vehicle position O to end point position B is less than distance OC from vehicle position O to way point position C (i.e., OB<OC), and the position of farthest point P coincides with the position of middle point C, the vehicle search notification device 10 can determine that the vehicle 130 is behind the user 110.

As shown in FIG. 8B, if distance OA from vehicle position O to start point position A is greater than distance OC from vehicle position O to way point position C (i.e., OA>OC), and distance OB from vehicle position O to end point position B is greater than distance OC from vehicle position O to way point position C (i.e., OB>OC), and the position of closest point Q coincides with the position of middle point C, the vehicle search notification device 10 determines that the vehicle 130 is in front of the user 110.

As shown in FIG. 8C, if distance OA from vehicle position O to start point position A is greater than distance OC from vehicle position O to way point position C (i.e., OA>OC), and distance OC from vehicle position O to way point position C is greater than distance OB from vehicle position O to end point position B (i.e., OC>OB), and the position of farthest point P coincides with the position of end point position B, the vehicle search notification device 10 determines that the vehicle 130 is to the left of the user 110.

As shown in FIG. 8D, if distance OA from vehicle position O to start point position A is less than distance OC from vehicle position O to way point position C (i.e., OA<OC), and distance OC from vehicle position O to way point position C is less than distance OB from vehicle position O to end point position B (i.e., OC<OB), and the position of farthest point P coincides with the position of start point position A, the vehicle search notification device 10 determines that the vehicle 130 is to the right of the user 110.

Figure 8E:
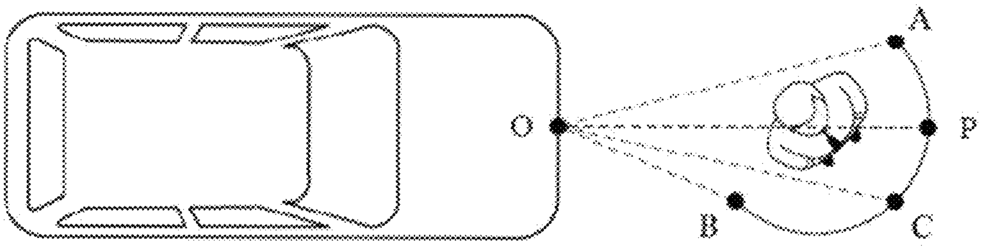

As shown in FIG. 8E, if distance OA from vehicle position O to start point position A is less than distance OC from vehicle position O to way point position C (i.e., OA<OC), and distance OB from vehicle position O to end point position B is less than distance OC from vehicle position O to way point position C (i.e., OB<OC), and farthest point P is located on segment AC of the curved trajectory, the vehicle search notification device 10 determines that the vehicle 130 is to the right rear of the user 110.

Figure 8F:
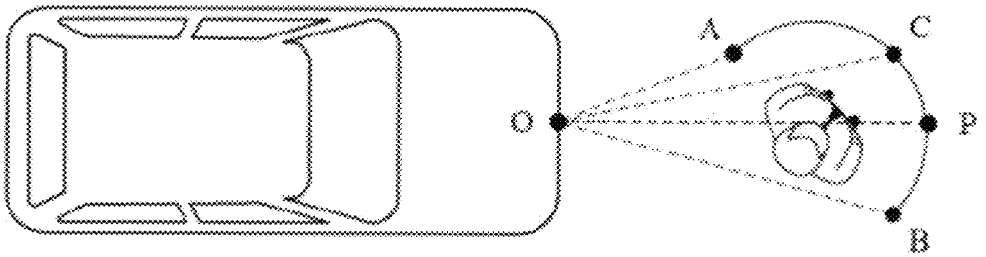

As shown in FIG. 8F, if distance OA from vehicle position O to start point position A is less than distance OC from vehicle position O to way point position C (i.e., OA<OC), and distance OB from vehicle position O to end point position B is less than distance OC from vehicle position O to way point position C (i.e., OB<OC), and farthest point P is located on segment BC of the curved trajectory, the vehicle search notification device 10 determines that the vehicle 130 is to the left rear of the user 110.

Figure 8G:
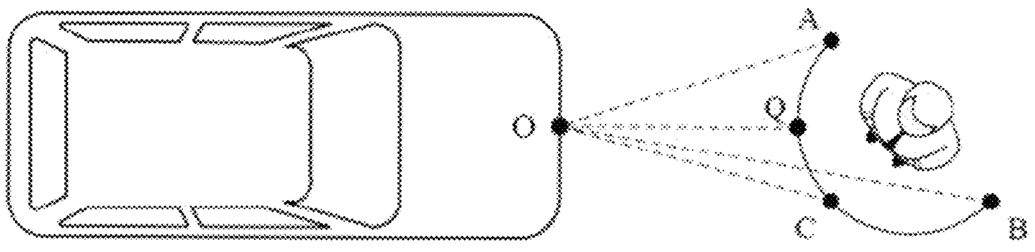

As shown in FIG. 8G, if distance OA from vehicle position O to start point position A is greater than distance OC from vehicle position O to way point position C (i.e., OA>OC), and distance OB from vehicle position O to end point position B is greater than distance OC from vehicle position O to way point position C (i.e., OB>OC), and nearest point Q is located on segment AC of the curved trajectory, the vehicle search notification device 10 determines that the vehicle 130 is to the right front of the user 110.

Figure 8H:
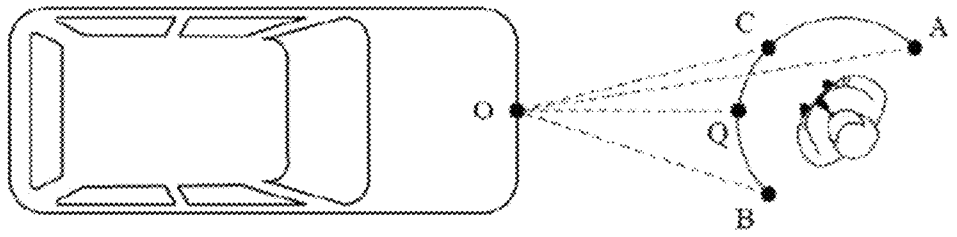

As shown in FIG. 8H, if distance OA from vehicle position O to start point position A is greater than distance OC from vehicle position O to way point position C (i.e., OA>OC), and distance OB from vehicle position O to end point position B is greater than distance OC from vehicle position O to way point position C (i.e., OB>OC), and nearest point Q is located on segment BC of the curved trajectory, the vehicle search notification device 10 determines that the vehicle 130 is to the left front of the user 110.

Since the UWB signal can provide positioning accuracy within a few centimeters, the vehicle search notification device 10 can determine the relative direction of the vehicle 130 with respect to the user 110 based on the above solutions to provide a corresponding guidance notification to the user thereby providing corresponding guidance to the user 110 to help the user 110 quickly to help the user quickly determine a subsequent movement direction according to the current orientation of the user 110.

As shown in FIG. 6, in response to starting the UWB module and detecting the UWB signals sent by the user terminal 12, the vehicle search notification device 10 also determines the distance from the vehicle 130 to the user 110 according to the obtained UWB information. In some embodiments, the vehicle search notification device 10 can first determine a straight line AB based on start point position A and end point position B of the curved trajectory and then draw a perpendicular line to straight line AB passing through way point position C to determine the intersection of the perpendicular line and the straight line AB. The intersection can be determined as the user position. Then, the vehicle search notification device 10 can determine the distance $d_{distance}$ from the vehicle 130 to the user 110 according to vehicle position O and the user position.

As shown in FIG. 4, after determining relative position D ($d_{direction}$, $d_{distance}$) of the vehicle 130 with respect to the user 110, the vehicle search notification device 10 plays voice notifications about the vehicle search navigation through external loudspeakers 22 of the vehicle according to the relative position D. For example, the voice notification can include a notification about the relative position D.

In some embodiments, the vehicle search notification device 10 can first fill the relative direction information $d_{direction}$ and the distance information $d_{distance}$ into a pre-prepared text template $T_0$, i.e., "Master, I am in $d_{direction}$ from you by $d_{distance}$ meters," to generate corresponding voice notification text $T_{D0}$. Then, the vehicle search notification device 10 can input the voice notification text $T_{D0}$ into a Text-to-Speech (TTS) module to generate corresponding voice notification audio $A_{D0}$. Subsequently, the vehicle search notification device 10 can input voice notification audio $A_{D0}$ into one or more external loudspeakers 22 of the vehicle 130. The corresponding voice notification content about the vehicle search navigation can be played by the external loudspeakers 22. Thus, the user 110 can quickly find the accurate path to the vehicle position according to the sound source and notification content of the navigation voice.

In some embodiments, the vehicle search notification device 10 can continuously use the UWB module of the vehicle 130 to monitor the real-time position of the user 110 during the vehicle search notification process. Thus, a change trend $\Delta d_{distance}$ of the distance $d_{distance}$ from the vehicle 130 to the user 110 can be determined. The corresponding voice notification feedback can be provided to the user according to the change trend $\Delta d_{distance}$.

In some embodiments, after playing the voice notification content about the vehicle search navigation through the external loudspeakers 22 of the vehicle 130, the vehicle search notification device 10 can obtain distance $d_{distance}'$ from the vehicle 130 to the user 110 again after a predetermined time interval (e.g., every 10 seconds). If $\Delta d_{distance}=d_{distance}'-d_{distance}>0$, the vehicle search notification device 10 can determine that the distance from the vehicle 130 to the user 110 is increasing. Then, the vehicle search notification device 10 can play negative voice notifications, such as "You are heading in a wrong direction," through the external loudspeakers 22 of the vehicle 130 to remind the user 110 to change directions in time. On the contrary, if $\Delta d_{distance}=d_{distance}'-d_{distance}<0$, the vehicle search notification device 10 can determine that the distance from the vehicle 130 to the user 110 is decreasing. Thus, the vehicle search notification device 10 can play positive voice notifications through the external speakers 22 of the vehicle 130, such as "You are on the right track, please continue," to encourage the user 110 to proceed along the correct path. Thus, personalized navigation feedback can be provided according to real-time changes in the user position, which enhances human-vehicle interaction intelligence.

Those skilled in the art can understand that the text template T0 involving relative direction information $d_{direction}$ and distance information $d_{distance}$ is exemplary, is intended to illustrate the main concept of the present disclosure, provides an embodiment of the present disclosure, and is not used to limit the scope of the present disclosure.

In some embodiments, the vehicle search notification device 10 can further obtain parking position information p indicating the absolute position information of the vehicle 130 in the parking lot. The absolute position information can be played through the external speakers 22 of the vehicle 130 to facilitate the user 110 to determine the parking position of the vehicle 130 according to actual scenes.

Figure 9:
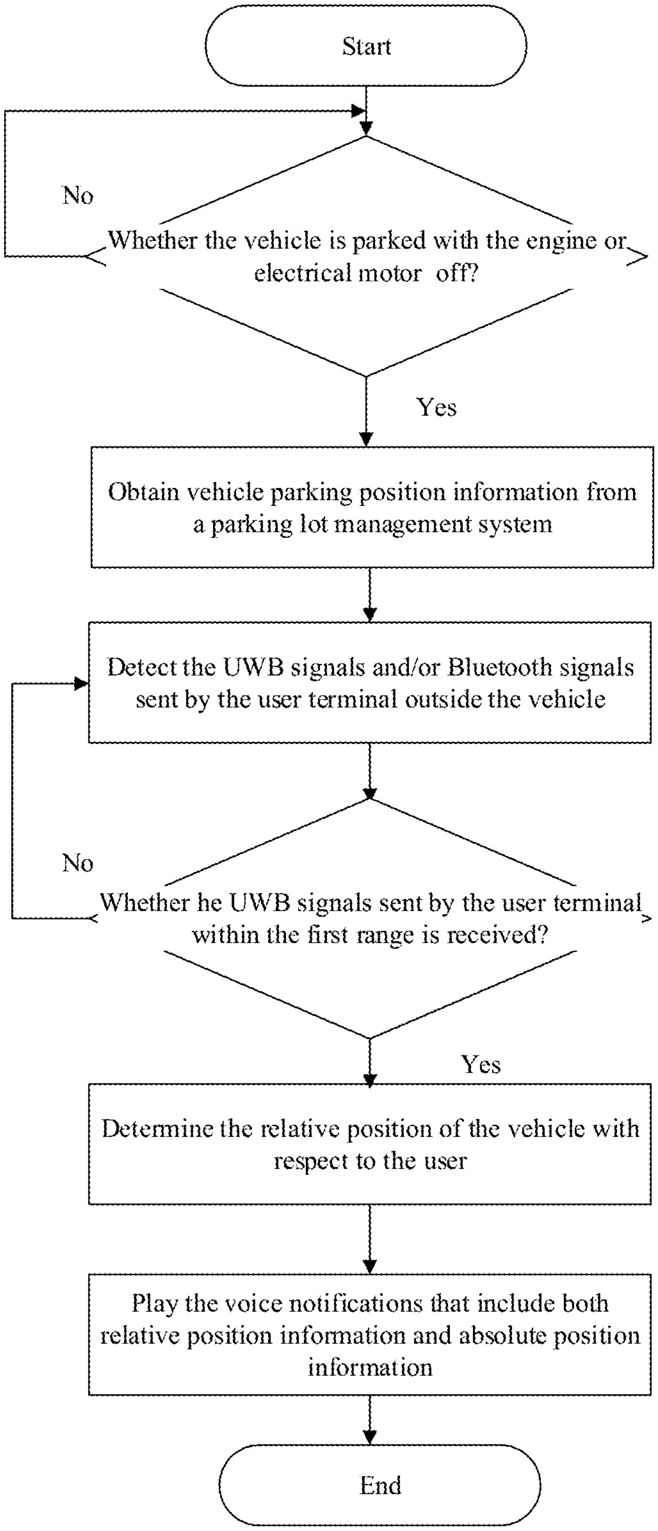
FIG. 9 is a schematic flowchart of a vehicle search notification method according to some embodiments of the present disclosure.

FIG. 9 is a schematic flowchart of a vehicle search notification method according to some embodiments of the present disclosure.

As shown in FIG. 9, in response to the vehicle 130 being parked with the engine or electrical motor off, the vehicle search notification device 10 can obtain parking position information p from the parking lot management system via a cloud platform of the Internet of Vehicles. The UWB module and/or Bluetooth® module can be continuously operated to detect the UWB signals and/or Bluetooth® signals sent by the user terminal 120 outside the vehicle 130.

Then, in response to receiving the UWB signals sent by the user terminal 120 within the first range, the vehicle search notification device 10 can determine relative position D ($d_{direction}$, $d_{distance}$) of the vehicle 130 with respect to the user 110.

Then, the vehicle search notification device 10 can fill the parking position information p, the relative direction information $d_{direction}$, and the distance information $d_{distance}$ into a pre-prepared text template $T_1$, i.e., "Master, I am in $d_{direction}$ from you by $d_{distance}$ meters, at parking position p," to generate corresponding voice notification text $T_{D1}$. Voice notification text $T_{D1}$ can then be input into a Text-to-Speech (TTS) module to generate corresponding voice notification audio $A_{D1}$. Subsequently, the vehicle search notification device 10 can input this voice notification audio $A_{D1}$ into the external speakers 22 of the vehicle 130 to play the voice notifications that include both relative position information D ($d_{direction}$, $d_{distance}$) and absolute position information p. Thus, the user 110 can quickly determine the subsequent movement direction according to both the sound source of the navigation voice and the notification contents of "front," "rear," "left," and "right." On another hand, the user 110 can determine whether the movement direction is right according to the change pattern of the parking position information on the movement path to release anxiety during the vehicle search process and enhance the user experience.

Those skilled in the art can understand that the solution of pre-obtaining the parking position information p when the vehicle 130 is parked with the engine or electrical motor off is merely a non-limiting embodiment of the present disclosure, is intended to demonstrate the main concept of the present disclosure, provides an embodiment of the present disclosure, and is not used to limit the scope of the present disclosure. In some other embodiments, the vehicle search notification device 10 can obtain absolute position information p in response to receiving user identification signals, which saves the data consumption of the vehicle search notification method.

Although the above method is illustrated and described as a series of actions to simply the explanation, the methods are not limited by the order of actions. According to one or more embodiments, some actions may occur in different orders and/or concurrently with other actions shown and described in this specification or actions understood by those skilled in the art.

Those skilled in the art can understand that information, signals, and data can be represented using any techniques and technologies from different techniques and technologies. For example, the data, instructions, commands, information, signals, bits, codewords, and code elements cited throughout the specification can be represented using voltages, currents, electromagnetic waves, magnetic fields or particles, optical fields or optical particles, or any combination thereof.

Further, those skilled in the art can further understand that various explanatory logic blocks, modules, circuits, and algorithm steps described in embodiments of the present disclosure can be implemented as electronic hardware, computer software, or a combination thereof. To clearly explain the interchangeability of hardware and software, various explanatory assemblies, frames, modules, circuits, and steps are generally described in functional forms. Such functionality can be implemented as hardware or software depending on specific applications and design constraints imposed on the overall system. Those skilled in the art can employ different ways to implement the described functionality in specific applications, but such implementation decisions should not be understood as departing from the scope of the present disclosure.

Although the vehicle search notification device 10 described above is implemented through a combination of software and hardware, the vehicle search notification device 10 can also be implemented separately in software or hardware. For hardware implementations, the vehicle search notification device 10 can be implemented using one or more dedicated integrated circuits (ASICs), digital signal processors (DSPs), programmable logic devices (PLDs), field-programmable gate arrays (FPGAs), processors, controllers, microcontrollers, microprocessors, or selected combinations of these devices for performing the functions described above. For software implementations, the vehicle search notification device 10 can be implemented using independent software modules running on a general-purpose chip, such as program modules (procedures) and function modules (functions). Each module can perform one or more functions and operations described here.

Various explanatory logic blocks and circuits described in connection with embodiments disclosed here can be implemented or executed using a general-purpose processor, digital signal processor (DSP), ASIC, FPGA, or other programmable logic devices, discrete gates or transistors, discrete hardware components, or any combination designed to perform the functions described. General-purpose processors can be microprocessors, but in an alternative solution, the processor can be any conventional processor, controller, microcontroller, or state machine. The processor may also be implemented as a combination of computing devices, such as a combination of a DSP and a microprocessor, multiple microprocessors, one or more microprocessors cooperating with a DSP core, or any other such configuration.

The description of the present disclosure is intended to enable those skilled in the art to make or use the present disclosure. Various modifications to these embodiments can be apparent to those skilled in the art, and the principles can be applied to other variations without departing from the spirit or scope of the present disclosure. Thus, the present disclosure is not intended to be limited to the embodiments described above. The present disclosure should conform to the widest scope of the principle and novel features of the present disclosure.

What is claimed is:

1. A vehicle search notification method comprising:

detecting a user identification signal outside a vehicle, the user identification signal including an Ultra Wide Band (UWB) signal;

in response to receiving the user identification signal, determining a relative position of the vehicle with respect to a user based on the user identification signal, the relative position including a relative direction of the vehicle with respect to the user; and playing a voice notification about vehicle search navigation through an external loudspeaker of the vehicle according to the relative position, the voice notification including the relative direction of the vehicle with respect to the user, wherein in response to receiving the user identification signal, determining a relative position of the vehicle with respect to a user based on the user identification signal includes:

determining the relative position of the vehicle with respect to the user according to the UWB signal;

determining a movement trajectory of a user terminal according to position information indicated by a plurality of UWB signals, the movement trajectory being a continuous movement trajectory generated by the user waving the user terminal;

obtaining three or more positions from the movement trajectory in a time sequence; and determining the relative direction of the vehicle with respect to the user according to the three or more positions.

2. The method according to claim 1, wherein:

detecting the user identification signal outside the vehicle includes:

detecting a UWB signal sent by the user terminal within a first range outside the vehicle by a UWB module of the vehicle.

3. The method according to claim 1, wherein:

detecting the user identification signal outside the vehicle includes:

detecting a short range wireless signal sent by the user terminal within a second range outside the vehicle using a Bluetooth module of the vehicle; and in response to receiving the user identification signal, determining the relative position of the vehicle with respect to the user includes:

in response to receiving the short range wireless signal, parsing the short range wireless signal to determine a user instruction; and in response to the short range wireless signal of the user instruction indicating vehicle search navigation, detecting a UWB signal sent by the user terminal within a first range outside of the vehicle by a UWB module and determining the relative position of the vehicle with respect to the user according to the UWB signal, the second range being larger than the first range.

4. The method according to claim 1, wherein:

the relative position includes a distance from the vehicle to the user; and the method further includes determining the relative direction of the vehicle with respect to the user according to a relationship of distances between the vehicle and the three or more positions.

5. The method according to claim 4, wherein:

the movement trajectory includes a non-vertical curved trajectory; and the three or more positions include start point position A, way point position C, and end point position B of the curved trajectory.

6. The method according to claim 5, wherein determining the relative direction of the vehicle with respect to the user according to the three or more positions includes:

determining that the vehicle is behind the user in response to distance OA from vehicle position O to start point position A being less than distance OC from vehicle position O to way point position C, and distance OB from vehicle position O to ending point position B being less than distance OC from vehicle position O to way point position C;

determining that the vehicle is in front of the user in response to distance OA from vehicle position O to start point position A being greater than distance OC from vehicle position O to way point position C, and distance OB from vehicle position O to end point position B being greater than distance OC from vehicle position O to way point position C;

determining that the vehicle is on a left side of the user in response to distance OA from vehicle position O to start point position A being greater than distance OC from vehicle position O to way point position C, and distance OC from vehicle position O to way point position C being greater than distance OB from vehicle position O to end point position B; and determining that the vehicle is on a right side of the user in response to distance OA from vehicle position O to start point position A being less than distance OC from vehicle position O to way point position C, and distance OC from vehicle position O to way point position C being less than distance OB from vehicle position O to end point position B.

7. The method according to claim 6, wherein:

way point position C is at a middle point of the curved trajectory; and determining the relative direction of the vehicle with respect to the user according to the three or more positions further includes:

determining farthest point P and nearest point Q on the curved trajectory relative to vehicle position O; and determining that the vehicle is to right rear of the user in response to $OA<OC$, $OB<OC$, and point P being on segment AC of the curved trajectory;

determining that the vehicle is to left rear of the user in response to $OA<OC$, $OB<OC$, and point P being on segment BC of the curved trajectory;

determining that the vehicle is to right front of the user in response to $OA>OC$, $OB>OC$, and point Q being on segment AC of the curved trajectory; and determining that the vehicle is to left front of the user in response to $OA>OC$, $OB>OC$, and point Q being on segment BC of the curved trajectory.

8. The method according to claim 4, wherein determining the relative position of the vehicle with respect to the user according to the user identification signal further includes:

determining a user position according to the short range wireless signal or the UWB signal; and determining the distance from the vehicle to the user according to a vehicle position and the user position.

9. The method according to claim 1, wherein playing the voice notification about vehicle search navigation by the external loudspeaker of the vehicle according to the relative position further includes:

obtaining vehicle parking position information; and playing the voice notifications including the relative position and the vehicle parking position information by the external loudspeaker of the vehicle.

10. A vehicle search notification device comprising:

one or more memories; and one or more processors communicatively connected to the one or more memories and configured to detect a user identification signal outside a vehicle, the user identification signal including an Ultra Wide Band (UWB) signal;

in response to receiving the user identification signal, determine a relative position of the vehicle with respect to a user based on the user identification signal, the relative position including a relative direction of the vehicle with respect to the user; and play a voice notification about vehicle search navigation through an external loudspeaker of the vehicle according to the relative position, the voice notification including the relative direction of the vehicle with respect to the user, wherein in response to receiving the user identification signal, determining a relative position of the vehicle with respect to a user based on the user identification signal includes:

determining the relative position of the vehicle with respect to the user according to the UWB signal;

determining a movement trajectory of a user terminal according to position information indicated by a plurality of UWB signals, the movement trajectory being a continuous movement trajectory generated by the user waving the user terminal;

obtaining three or more positions from the movement trajectory in a time sequence; and determining the relative direction of the vehicle with respect to the user according to the three or more positions.

11. The device according to claim 10, wherein the one or more processors are further configured to:

detect a UWB signal sent by a user terminal within a first range outside the vehicle by a UWB module of the vehicle.

12. The device according to claim 10, wherein the one or more processors are further configured to:

detect a short range wireless signal sent by the user terminal within a second range outside the vehicle using a Bluetooth module of the vehicle; and in response to receiving the short range wireless signal, parse the short range wireless signal to determine a user instruction; and in response to the short range wireless signal of the user instruction indicating vehicle search navigation, detect a UWB signal sent by the user terminal within a first range outside of the vehicle by a UWB module and determine the relative position of the vehicle with respect to the user according to the UWB signal, the second range being larger than the first range.

13. The device according to claim 12, wherein:

the relative position includes a distance from the vehicle to the user; and the method further includes determining the relative direction of the vehicle with respect to the user according to a relationship of distances between the vehicle and the three or more positions.

14. The device according to claim 13, wherein:

the movement trajectory includes a non-vertical curved trajectory; and the three or more positions include start point position A, way point position C, and end point position B of the curved trajectory.

15. The device according to claim 14, wherein the one or more processors are further configured to:

determine that the vehicle is behind the user in response to distance OA from vehicle position O to start point position A being less than distance OC from vehicle position O to way point position C, and distance OB from vehicle position O to ending point position B being less than distance OC from vehicle position O to way point position C;

determine that the vehicle is in front of the user in response to distance OA from vehicle position O to start point position A being greater than distance OC from vehicle position O to way point position C, and distance OB from vehicle position O to end point position B being greater than distance OC from vehicle position O to way point position C;

determine that the vehicle is on a left side of the user in response to distance OA from vehicle position O to start point position A being greater than distance OC from vehicle position O to way point position C, and distance OC from vehicle position O to way point position C being greater than distance OB from vehicle position O to end point position B; and determine that the vehicle is on a right side of the user in response to distance OA from vehicle position O to start point position A being less than distance OC from vehicle position O to way point position C, and distance OC from vehicle position O to way point position C being less than distance OB from vehicle position O to end point position B.

16. The device according to claim 15, wherein:

way point position C is at a middle point of the curved trajectory; and the one or more processors are further configured to:

determine farthest point P and nearest point Q on the curved trajectory relative to vehicle position O; and determine that the vehicle is to right rear of the user in response to $OA<OC$, $OB<OC$, and point P being on segment AC of the curved trajectory;

determine that the vehicle is to left rear of the user in response to $OA<OC$, $OB<OC$, and point P being on segment BC of the curved trajectory;

determine that the vehicle is to right front of the user in response to $OA>OC$, $OB>OC$, and point Q being on segment AC of the curved trajectory; and determine that the vehicle is to left front of the user in response to $OA>OC$, $OB>OC$, and point Q being on segment BC of the curved trajectory.

17. The device according to claim 13, wherein the one or more processors are further configured to:

determine a user position according to the short range wireless signal or the UWB signal; and determine the distance from the vehicle to the user according to a vehicle position and the user position.

18. The device according to claim 10, wherein the one or more processors are further configured to:

obtain vehicle parking position information; and play the voice notifications including the relative position and the vehicle parking position information by the external loudspeaker of the vehicle.

19. A vehicle comprising:

an external speaker arranged on an inner side of a vehicle body panel;

a monitor module;

one or more memories; and one or more processors communicatively connected to the one or more memories the external speaker, and the monitor module and being configured to:

detect a user identification signal outside a vehicle by the monitor module, the user identification signal including an Ultra Wide Band (UWB) signal;

in response to receiving the user identification signal, determine a relative position of the vehicle with respect to a user based on the user identification signal, the relative position including a relative direction of the vehicle with respect to the user; and play a voice notification about vehicle search navigation through an external loudspeaker of the vehicle according to the relative position, the voice notification including the relative direction of the vehicle with respect to the user, wherein in response to receiving the user identification signal, determining a relative position of the vehicle with respect to a user based on the user identification signal includes:

determining the relative position of the vehicle with respect to the user according to the UWB signal;

determining a movement trajectory of a user terminal according to position information indicated by a plurality of UWB signals, the movement trajectory being a continuous movement trajectory generated by the user waving the user terminal;

obtaining three or more positions from the movement trajectory in a time sequence; and determining the relative direction of the vehicle with respect to the user according to the three or more positions.

20. The vehicle of claim 19, wherein the processors are further configured to:

detect a UWB signal sent by a user terminal within a first range outside the vehicle by a UWB module of the vehicle.

* * * * *